United States Patent
Park et al.

(10) Patent No.: US 12,196,551 B2
(45) Date of Patent: Jan. 14, 2025

(54) BROADBAND INTERFEROMETRY AND METHOD FOR MEASUREMENT RANGE EXTENSION BY USING SAME

(71) Applicant: AUTOMATED PRECISION INC., Rockville, MD (US)

(72) Inventors: Yongwoo Park, Rockville, MD (US); Shuai Sun, Rockville, MD (US); Kam Lau, Rockville, MD (US)

(73) Assignee: AUTOMATED PRECISION INC., Rockville, MD (US)

( * ) Notice: Subject to any disclaimer, the term of this patent is extended or adjusted under 35 U.S.C. 154(b) by 227 days.

(21) Appl. No.: 17/716,266

(22) Filed: Apr. 8, 2022

(65) Prior Publication Data
US 2023/0324165 A1    Oct. 12, 2023

(51) Int. Cl.
G01B 9/0209 (2022.01)
G01B 9/02004 (2022.01)

(52) U.S. Cl.
CPC ........ G01B 9/0209 (2013.01); G01B 9/02004 (2013.01); *G01B 2290/20* (2013.01); *G01B 2290/25* (2013.01); *G01B 2290/35* (2013.01); *G01B 2290/70* (2013.01)

(58) Field of Classification Search
CPC .......... G01B 9/02004; G01B 9/02078; G01B 2290/35; G01B 2290/40; G01B 2290/70
See application file for complete search history.

(56) References Cited

U.S. PATENT DOCUMENTS

| | | | | |
|---|---|---|---|---|
| 10,436,569 B2* | 10/2019 | Lau | .................... | G01B 9/02084 |
| 2008/0100847 A1* | 5/2008 | Szafraniec | ......... | G01B 9/02004 356/477 |
| 2014/0139846 A1* | 5/2014 | Jensen | ................ | G01B 9/02049 356/498 |
| 2016/0123715 A1* | 5/2016 | Froggatt | ............ | G01B 9/02044 65/102 |
| 2023/0332885 A1* | 10/2023 | Petitgrand | .......... | G01B 9/02032 |

* cited by examiner

Primary Examiner — Michael A Lyons
(74) Attorney, Agent, or Firm — POLSINELLI PC

(57) ABSTRACT

A broadband interferometry for a measurement range extension beyond a coherence length of a light source is achieved through a local oscillation of the reference beam is replicated by a cavity multiplication or cascading optical delayed lines with a fiber optic cavity, and quantifiable optical properties including a wavelength group delay, a chromatic dispersion, a polarization mode dispersion and a model dispersion are inserted into the local oscillation of the reference beam to incrementally quantify the replicated copies of the local oscillation as the number of the delayed copies of the local oscillation increase for extension of a measurement rage to the target.

27 Claims, 5 Drawing Sheets

Single mode fiber system for the reference arm

Optical path difference between reference arm 1 and 2

$$OPD = L_2 - L_1 = L_0 + m(L_{c2} - L_{c1})$$

m is the order of the multiplication (0, 1, 2, ...).
$L_0$ is the OPD for m = 0
$L_1$ is the OPL of reference arm 1
$L_2$ is the OPL of reference arm 2

$$OPD = L_2 - L_1 = L_0 + m(L_{c2} - L_{c1})$$

FIG. 7

PM fiber system for the reference arm

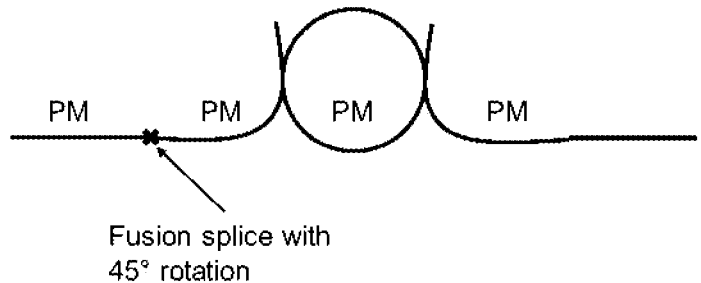

Fusion splice with 45° rotation

Optical path difference between the two polarizations in the reference arm $$OPD = L_F - L_S = (l_0 + ml_c)\Delta n$$

m is the order of the multiplication (0, 1, 2, ...).
$l_0$ is the fiber length after the splice point for m = 0
$l_c$ is the fiber length of the cavity

FIG. 8

PM fiber system for the reference arm $$OPD = L_F - L_S = (l_0 + ml_c)\Delta n$$

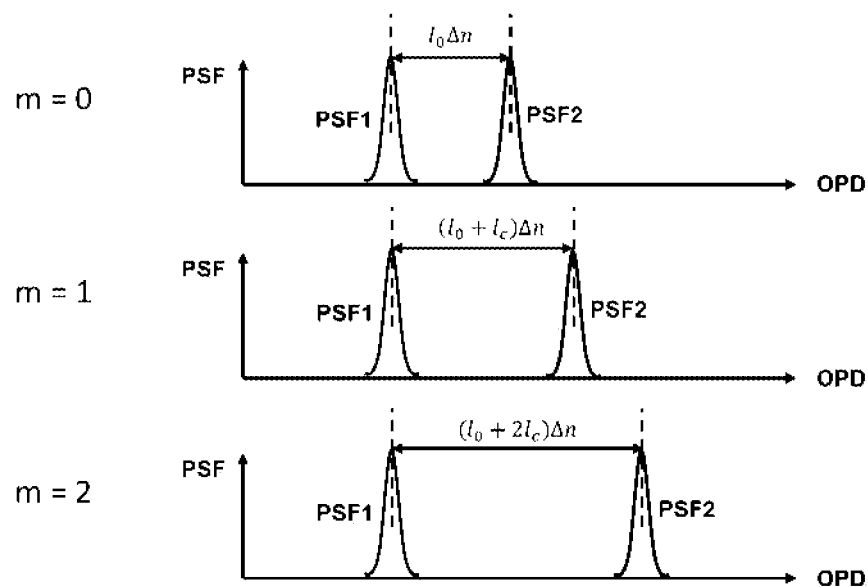

BROADBAND INTERFEROMETRY AND METHOD FOR MEASUREMENT RANGE EXTENSION BY USING SAME

BACKGROUND

Field of the Disclosure

The present disclosure relates to an interferometry and, more specifically, a broadband interferometry and a method for measurement range extension using the same. Although the present disclosure is suitable for a wide scope of applications, it is particularly suitable for range extension in the broadband interferometry extending a measurement range beyond a coherent length of a light source.

Description of the Background

There has been growing demands for methods and systems for broadband light interferometry as a range detection solution thanks to its superior resolution, accuracy, and high sensitivity. Two types of broadband interferometer systems such as Optical Frequency Domain Reflectometry (OFDR) and Spectral-domain reflectometry (SDR) are the most commonly studied systems.

OFDR is a broadband interferometry using a wavelength-tunable light source. When light from a measurement arm in an interferometer is combined with a local oscillator from a reference arm, interference can occur in the wavelength sweep if optical path lengths from both the measurement arm and the reference arm are within a coherence length of the system. In a wavelength swept interferometer, it is proportional to the inverse of laser instantaneous linewidth. Fourier transformation of the acquired interferogram calibrated in an optical frequency coordinate can provide a point spread function (PSF) of the light reflected from a target surface where the distance information can be determined by searching a peak amplitude of the PSF.

SDR is another approach of the broadband interferometry. In order to acquire the spectral interference corresponding to a beating frequency information between the measurement and the local oscillator, SDR acquires the spectrum directly in spectral domain instead of sweeping a narrow line wavelength laser. A high resolution spectrometer can be used for acquiring the spectrogram where a high speed line scan camera can be implemented for a high speed measurement.

However, as a range detection apparatus, aforementioned interferometers as range detection solutions have a limitation in measurement ranges due to the coherence length of the interferometer system. This is because the coherence length of the range apparatus using the interferometers is proportional to square of wavelength and inversely proportional to the laser linewidth or the spectrometer resolution of SDR. Thus, SDR depends highly on the system's spectral resolution.

In OFDR, the spectral linewidth is often compromised by the wavelength tuning speed as the lasing build-up time is shortened. On the other hand, SDR requires a large spatial diffraction with a long propagation distance for increasing the spectral resolution with limitations of diffraction efficiency, cost, system complexity and size, etc. As a result, the coherence length has been the major limiting factor with associated measurement speed in practical implementation of OFDR and SDR.

SUMMARY

Accordingly, the present disclosure is directed to a broadband interferometry and a method for measurement range extension that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the purpose of the present invention, as embodied and broadly described, a broadband interferometry for a measurement range extension beyond a coherence length of a light source includes a wavelength tunable laser as the light source outputting a coherence wavelength beam; an interferometer including a reference arm and a measurement arm and disposed between the wavelength tunable laser and a target to be measured; a first beam splitter dividing the a coherent wavelength beam into a first portion for the reference arm and a second portion for the measurement arm; a signal processing circuit including first and second photoreceivers and an analog electrical differential amplifier that amplifies balanced photo-coupled current signal into voltage signal from the photoreceivers where the coherent superposition of the portion of the reference and the measurement arm are photocoupled, wherein a local oscillation as a part of the superposition is replicated to generate a series of temporally delayed copies of the local oscillation, and quantifiable optical properties are inserted into the temporally delayed copies for incremental quantification as the number of the delayed copies of the local oscillation increase for extension of a measurement range to the target beyond the coherence length of the light source.

The broadband interferometry in the present disclosure further comprises a second beam splitter, alternatively a 2×2 fiber-optic coupler combining the coherent wavelength beams from the reference arm and the measurement arm using the two input ports, and outputting the superposition of the coherent beams into two output port with equal power splitting ratio so that the first photodiode and the second photodiode acquire the interference signal and convert into current signal as a balanced detection way.

In the broadband interferometry in the present disclosure, the system replicates the first portion of the coherent wavelength beam through a cavity multiplication or a delay multiplication (or cascading optical delayed lines) by using a fiber optic cavity.

In the broadband interferometry in the present disclosure, the fiber optic cavity includes a fiber optic Fabry-Perot cavity or a free space Fabry-Perot cavity where the first portion of the coherent wavelength beam in the fiber optic cavity circulates with a fixed circulation time and a fraction of the first portion of the coherent wavelength beam is coupled out to an output port repeatedly every circulation loop.

In the broadband interferometry in the present disclosure, the fiber optic Fabry-Perot cavity includes two reflectors attached to both ends with a 2×2 fiber optic coupler.

In the broadband interferometry in the present disclosure, the delay multiplication is achieved by cascaded two arm delay lines made with two fiber couplers that generate a finite number of copies of the local oscillation by factor of $2^N$ (N being a cascaded number).

In the broadband interferometry in the present disclosure, the quantifiable optical properties include a wavelength group delay, a chromatic dispersion, a polarization mode dispersion and a modal dispersion.

In the broadband interferometry in the present disclosure, the quantifiable optical properties are continuously accumulated while the first portion of the coherent wavelength beam propagates in the reference arm and ends up with discrete and incremental quantities at each roundtrip loop or delay sequences.

In the broadband interferometry in the present disclosure, the quantifiable optical properties are used to measure accumulated group delay dispersions included by the number of circulations in the reference arm.

In the broadband interferometry in the present disclosure, the fiber optic cavity includes a dispersion compensation fiber or a chirped fiber Bragging grating.

In the broadband interferometry in the present disclosure, the fiber optic cavity includes a single mode fiber system that comprises a first reference arm and a second respectively include a first cavity with a first fiber optic ring resonator and a second cavity with a second fiber optic ring resonator.

In the broadband interferometry in the present disclosure, an optical path difference (OPD) between the first reference arm and the second reference arm of the fiber optic cavity is represented by an equation, $OPD=L_2-L_1=L_0+m(L_{c2}-L_{c1})$, where m is an order of multiplication (0, 1, 2, 3, . . . ), $L_0$ is an OPD for m=0, $L_1$ is an optical path length (OPL) of the first reference arm, $L_2$ is an OPL of the second reference arm, $L_{c1}$ is a first resonator loop length of the first reference arm, and $L_{c2}$ is a second resonator loop length of the second reference arm.

In the broadband interferometry in the present disclosure, interference waveforms from the superposition of the first and the second portion of the coherent wavelength beams are Fourier transformed to obtain two point spread functions (PSFs) separated in accordance with a difference in the first and second resonator loop lengths.

In the broadband interferometry in the present disclosure, the fiber optic cavity includes two polarization modes in a fiber resonator made of a polarization maintaining fiber (PMF).

In another aspect of the present invention, an broadband interferometry for a measurement range extension beyond a coherence length of a light source includes a wavelength tunable laser as the light source outputting a coherence wavelength beam; an interferometer including a reference arm and a measurement arm and disposed between the wavelength tunable laser and a target to be measured; a first beam splitter dividing the a coherent wavelength beam into a first portion of the coherent wavelength beam propagating in the reference arm and a second portion of the coherent wavelength beam propagating in the measurement arm; a second beam splitter combining a first propagated signal from the reference arm and a second propagated signal from the measurement arm as superposition of the coherent waves, and splitting in two ways via two output ports with 180 degree interference phase shift each other and equal power splitting ratio; and a signal processing circuit including first and second photodiodes and an analog electrical differential amplifier that amplifies a difference between the first and second processed signals in a way of canceling common non-interference signal and summing up interference signals, wherein a local oscillation of the first portion of the coherent wavelength beam is replicated to generate a series of temporally delayed interference via cascaded local oscillations of the first portion of the coherent wavelength beam, so that a measurement range to the target is extended beyond the coherence length of the light source.

In a further aspect of the present invention, a method for extending an broadband interferometric measurement range beyond a coherence length of a light source includes directing a reference beam from a wavelength tunable laser to a reference interferometer arm and to a measurement beam to be reflected by an object for measurement; multiplicating a cavity or optical delay lines of the local oscillation in the reference beam by $M^N$ (M being the number of interferometer arms and N being the number of cascaded couplers in the reference interferometer arm) to generate a series of temporally delayed copies of a local oscillation of the reference beam; inserting quantifiable optical properties to the local oscillation in the reference beam; detecting localized interference fringes after combining the local oscillation in the reference beam and the measurement beam; and analyzing the interference fringes for the measurement range extension.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 7 is a schematic view of the range extension apparatus made with single polarization maintaining fiber resonator for creating recirculating LO copies and identifying the order of the recirculation according to the present disclosure;

FIG. 8 is a schematic view illustrating the separation of the point spread functions obtained from the measurement of two interferograms using the single polarization maintaining fiber resonator shown in FIG. 7;

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

The present disclosure provides a system and a method for extending a measurement range apparatus for an interferometry system including OFDR and SDR. The system facilitates an apparatus allowing to repeat a local oscillator along the time of light travel. In other words, the local oscillation (LO) is replicated with periodic time interval with the apparatus. The replicated local oscillation, thus, allows OFDR or SDR implemented in an extended range beyond a coherence length limited by a wavelength linewidth of the system.

The extending range described above includes the apparatus schematic and method of identifying corresponding delays of the replicated copies. An exemplary system may include a light source, a measurement interferometer arm, an interferometer reference arm with delayed copies, an optional auxiliary interferometer for k-domain linearization (so-called k-clock), and receivers for optical power signal to voltage signal conversion.

Alternatively, the replication can be realized by cascading optical delay lines, or by using an optical cavity with optical ring resonators for repeating optical coherence as time-delayed copies in the reference arm along the distance. Since the local oscillation repeats along the distance, the coherence interaction with the measurement arm (interference) is extended longer than its intrinsic coherence length. Interferences are made with beams reflected from a target as long as the target is within the copied coherence range.

However, the repetition of the coherence length incurs a range ambiguity as the finite Fourier domain distance range is repeated providing folded information of ranging as well as the intrinsic nature of the Fourier transformation in which one cannot distinguish whether the distance is on negative or positive side. In other words, a target located at L distance further than the LO length could generate the same beat frequency as another target located L distance closer than the LO length. Thus, an identification of the interfering replication copy is needed for determining proper ranging.

Thus, the present disclosure also provides a system and a method for identifying the delay-line replication copies in the interferometry. The methods may include multiplication of material and waveguide dispersion, multiplication of differential delays, multiplication of polarization mode delay, etc.

Figure 1:
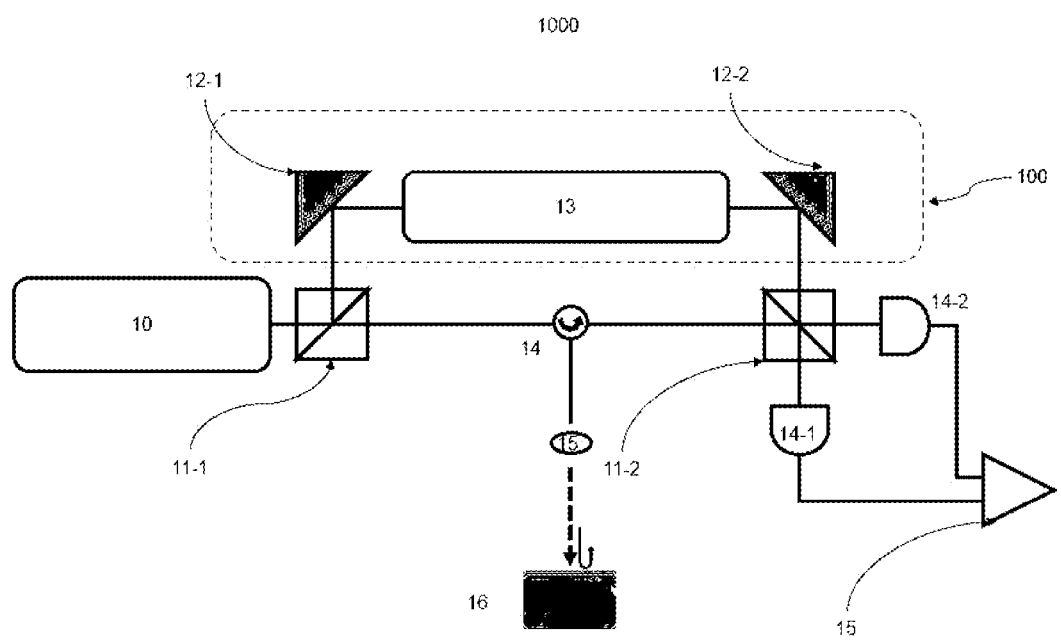
FIG. 1 is a schematic view of a Mach-Zehnder-type interferometer with a range extender for cavity multiplication by an optical cavity or delay multiplication by an optical delay lines according to the present disclosure.

FIG. 1 illustrates a schematic view of a two-arm interferometer 1000 (Mach-Zehnder type interferometer) which may include a reference arm 100 and a measurement arm 200, and the reference arm 100 may include a cavity multiplication unit 13 (or delay multiplication unit) as a range extender in a reference interferometer arm according to the present disclosure.

As shown in FIG. 1, the two-arm interferometer 1000 with a wavelength tunable laser 10 provides an optical path in the cavity multiplication unit that has round-trips and a partial transmission so that multiple transmissions are realized with a fixed incremental time delay as the cavity round trip time. The wavelength tunable laser 10 is used for sweeping the wavelength of the light emission in time for realizing an interferogram acquisition with respect to the optical wavelength (or wave number, i.e., inverse of the wavelength).

The emitted light from the wavelength tunable laser 10 is split into two optical paths using a first beam splitter 11-1. Alternatively, that may be implemented with a fiber optic two-arm coupler. One optical path goes to a reference arm including a first folding mirror 12-1 and an optical cavity 13 for cavity multiplication (or optical delay lines for delay multiplication). Alternatively, the free-space path routing using the folding mirrors can be replaced with fiber-optic interconnections using optical fibers, connectors or fusion splicing etc. Another optical path goes to a measurement arm including an optical circulator, an objective lens and a target to be measured. The transmission from the first beam splitter 11-1 is routed to an objective lens 15 via an optical circulator 14 that may be implemented with a fiber optic circulator.

The objective lens 15 focuses lights on a surface of a target 16 and re-couples the light reflected from the target 16 to the single mode fiber optic path to a second beam splitter 11-2. Alternatively, that may be implemented with a fiber optic two arm coupler. The reflection path from the first beam splitter 11-1 is directed to the cavity multiplication unit 13 using a first folding mirror 12-1 (or guided by a single mode fiber). Delayed copies of transmission are generated via the cavity multiplication 13 and reflected by the second folding mirror 12-2 and the second beam splitter 11-2 respectively. The cavity multiplication unit 13 may be implemented with a fiber optic 2×2 equal power splitting coupler.

The intensity outputs are generated in two output ports after combining the two inputs from the reference arm 100 and the measurement arm 200. The output waves at the ports are linear superposition of the input reference and measurement arm waves and their irradiance (intensity) modulation phases differ by 180 degree in phase. Thus, the intensity variation in time by the coherent interference is differential (e.g., if waveforms at two ports are 180-degree shifted in phase, the differential detection will add up their amplitudes). However, all the common modulations which are not related to coherent interference will be canceled out by the differential detection as they are common at both ports. This common terms also include the delayed copies' intensity modulations which are not interfering with the lights reflected from the measurement arm. Alternatively, the addition and subtraction of signals in analog can be realized in photodetectors instead of the differential amplifier by connecting the cathode of a photodiode to the anode of the other with bias voltage. It is so called a 'balanced photo receiver'. Thus, it plays an important role to suppress non-coherent modulation components in the interferometer output signals where the cavity multiplication generates large portions of common backgrounds.

For a linear sweep in optical frequency (or linear in the wave number) in OFDR, the intensity modulation by the interference is sinusoidal with constant modulation frequency which is generated instantaneously by the beat frequency between the reference and measurement arms lights when combined at the second splitter. The beat frequency is proportional to the time-of-flight of lights reflected from the target.

Sampling the beat frequency waveform and proper signal processing with the Fast Fourier Transform yield PSF as the reflectivity profile of the target along the time allowing to determine the distance location of the target. However, due to the intrinsic nature of the light source, the wavelength sweep of the tunable laser may not be perfectly linear even with a perfect linear control signal which results in a distorted PSF with inefficient background noise suppression. Therefore, depending on the ranging resolution and the sensitivity required by the application, a k-clock re-linearization could be implemented tapping the optical signal from the same light source and resample the OFDR signals based on uniform k-domain step.

Another challenge in the OFDR interferometry is a ranging ambiguity. Since the waveform acquisition (e.g., by using a digitizer) like a hologram is a scalar waveform which does not inform if the delay is in a positive or a negative scale. There are methods available to resolve the sign ambiguity in spectral domain interferometers. However, considering this natural ambiguity of the conventional interferometer measurement, the delay copy generated by the cavity may consider the cavity length at least to cover both positive and negative scales as shown in FIG. 2(b) to be discussed below.

Figure 2:
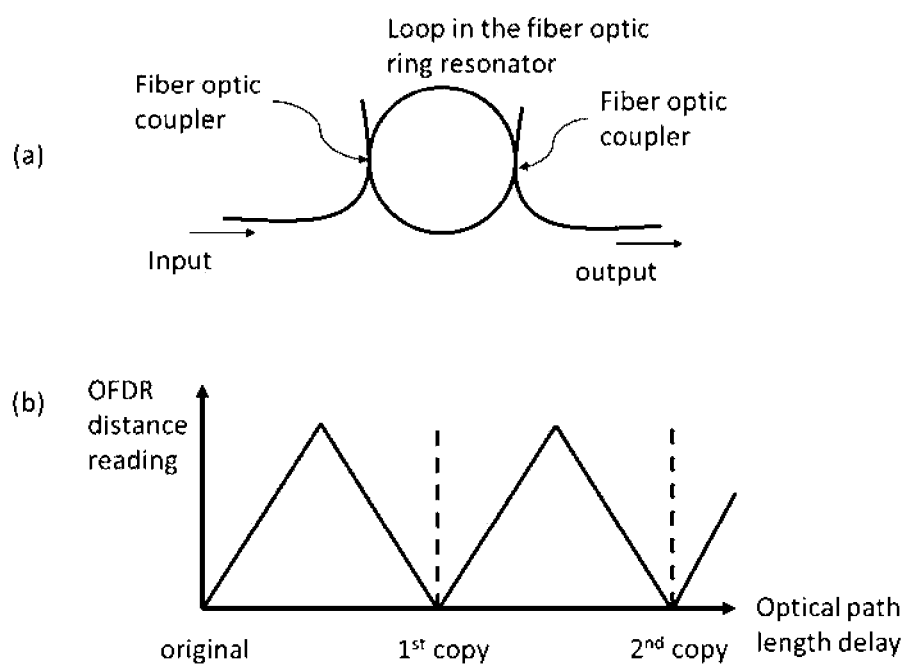
FIG. 2(a) is an example of the range extender using a fiber optic ring cavity where input and output ports of two fiber optic couplers are connected to repeated round-trips inside a loop of the fiber optic ring cavity.
FIG. 2(b) illustrates an OFDR range multiplication performed by the optical cavity where an OFDR distance reading range is repeated along an optical path length of an interferometer measurement arm.

FIG. 2 (a) illustrates a fiber optic ring cavity having input and the output ports of two fiber optic couplers so that the round-trip inside the loop can be repeated, and FIG. 2(b) illustrates OFDR range multiplication by using a cavity where the OFDR distance reading range is repeated along the optical path length of the measurement arm.

An example of the cavity is shown in FIG. 2(a) is a fiber optic ring cavity. The loop length of the ring (L) determines the round-trip time T (T=n×L/c) in the cavity corresponding to the fixed incremental delays of the repeated coherence, where n is an effective refractive index of the single mode fiber waveguide and c is the speed of light.

FIGS. 3(a) to 3(c) illustrate schematic views of a fiber-optic Fabry-Perot cavity, cascaded two-arm delay lines and a free-space Fabry-Perot for a range extender that may be implemented in the interferometer reference arm.

These are exemplary systems and methods to implement the delayed copies in the reference arm. The fiber optic cavity shown in FIG. 3(a) is a system and method of the delayed copy generation using a fiber optic cavity, where two reflectors are attached in the both ends of a 2-by-2 fiber optic coupler. The light in the cavity circulates with a fixed circulation time and a fraction of light is coupled out to the output port repeatedly every circulation loop. FIG. 3(a) and FIG. 3(c) are different constructions using the same Fabry-Perot type resonator (etalon). Like the ring cavity, both create repeated recirculated copies of the LO with the same cavity length delay. Unlike FIGS. 3(a) and 3(c), FIG. 3(b) illustrates the cascaded two-arm delay lines made with fiber couplers that create a finite number of copies by factor of $2^N$, where N is the number of cascade.

A method of adding physical properties to the cavity or the cascaded delay lines will be discussed hereinafter. The added physical properties may be incrementally quantified as the replicated copy number increases. The physical properties may include quantifiable optical properties such as waveguide group delay, chromatic dispersion, polarization mode dispersion, modal dispersion, etc. Such quantifiable optical properties can be accumulated continuously while propagating in the loop or the delay lines and end up with discrete and incremental quantities at every roundtrip loop or delay sequences.

Figure 3:
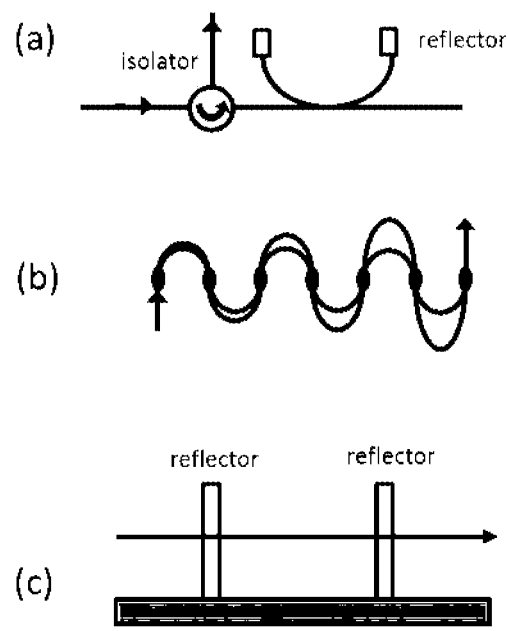
FIGS. 3(a) to 3(c) are schematic views of a fiber-optic Fabry-Perot cavity, cascaded two-arm delay lines and a free-space Fabry-Perot cavity as a range extender for an interferometer reference arm according to the present disclosure.

Aforementioned group delay dispersion is to measure accumulated group delay dispersions induced by the number of circulations in the cavity loop. As shown in FIG. 3 (a) and (c), lights propagate through an optical fiber in the cavity along which groups of waves are dispersed with respect to wavelengths. Typically, for a standard single mode fiber, wavelengths have relative delays of about 17 picoseconds per one nanometer wavelength within 1 km of the fiber, i.e., 17 ps/(km)/(nm). Thus, the accumulated group delay by the number of loop (i.e., range extension order) is very small. For example, 2-m fiber cavity loop may induce only 0.034 ps/nm for every circulation. The method described here is to detect the small discrete increase of dispersion when return signal from target is measured using broadband interferometers like OFDR and cross-chirp interference (XCI).

Even though the incremental dispersion is small, it affects to coherent signal detection in OFDR and XCI. This results in the broadening of their PSFs after the Fourier transform or the waveform compression of the acquired interferogram, respectively in OFDR and XCI.

For XCI, determining the incremental dispersion is to search the transform-limited PSF by applying additional prescribed amounts of dispersion (deviated with small quantity from the nominal dispersion) compensation in the numerical processing when creating the reference compression precursor complex waveform. This allows to find an optimum precursor waveform compressing the PSF transform-limited.

As for OFDR, the search of optimum dispersion for the interference can be made by applying a complex phase with respect to the wavenumber followed by the fast Fourier transformation corresponding to full numerical dispersion compensation. The complex phase is multiplied directly to the balanced waveform acquired by a balanced photodetector followed by a waveform digitizer for analog-to-digital voltage waveform conversion. For practical implementation, one may prescribe a series of complex phase vectors with incremental discrete dispersion amounts. An example of the complex phase for pure 2nd order dispersion case can be written as:

$$\phi(f)=\exp(-j2\pi^2\beta f^2),$$

where f is a base-band frequency and β is the group velocity dispersion. In practical application, one may add higher order terms to compensate for the higher order dispersion.

To increase reliability of the extension order detection, the dispersion in the cavity may be increased by replacing a standard single mode fiber with a highly dispersive fiber (e.g., dispersion compensation fiber (DCF) with 5 to 10 times larger magnitude of dispersion) or incorporating a chirped fiber Bragg grating (CFBG) into the cavity.

Figure 4:
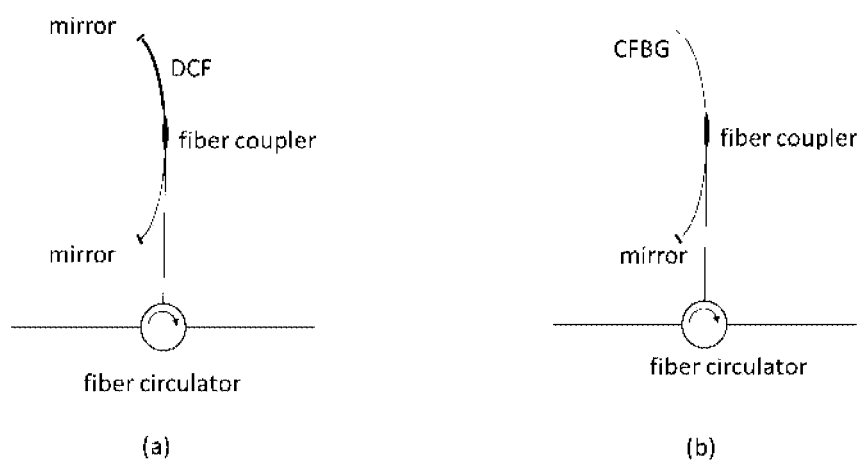
FIG. 4(a) is a schematic view of a fiber optic cavity in reflection mode including a dispersion compensating fiber as an example of the range extender for dispersion-based identification according to the present disclosure.
FIG. 4(b) a schematic view of a fiber optic cavity in reflection mode including a chirped fiber Bragg grating as an example of the range extender for dispersion-based identification according to the present disclosure.

For example, a fiber optic cavity in reflection mode including a dispersion compensating fiber (DCF) and fiber optic cavity in reflection mode including a chirped fiber Bragg grating (CFBG) may be implemented for range extension cavities for dispersion-based identification as shown in FIGS. 4(a) and 4(b).

Figure 5:
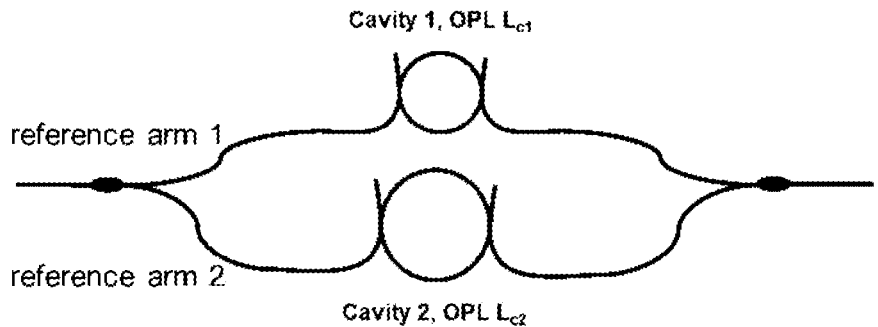
FIG. 5 is a schematic view of a range extender using two fiber optic ring resonators for creating recirculating local oscillation (LO) copies and identifying the order of the recirculation according to the present disclosure.

FIG. 5. is a schematic of the range extender implemented with two fiber optic ring resonators for creating recirculating LO copies and identifying the order of the replication.

As previously described, incremental waveguide group delay can be used as the copy number identification. The group delay is a relative delay between two cavities, i.e., the loop optical path length difference. As illustrated in FIG. 5, a single fiber-optic cavity may create multiple copies of LO with equally spaced delay defined by the loop length whose optical path length is defined here as L1. Similarly, from the second cavity, repeatedly-copied LOs are created with repeated delay L2. Both copies interfere with the measurement light allowing two range measurements. The two interferences may be acquired in separate detection arms or arranged to be orthogonal in polarization so that the two LOs are not interfering. To determine the order of the range extension, the relative OPD difference is measured based on the relation shown in FIG. 5 where LO is the constant OPD between the two cavities made by the reference arm length difference. The OPD increases by the factor of m that is the number of loops in which the light circulates.

An optical path difference (OPD) between the first reference arm and the second reference arm of the fiber optic cavity is represented by an equation, OPD=L2−L1=L0+m (Lc2−Lc1), where m is an order of multiplication (0, 1, 2, 3, . . . ), LO is an OPD for m=0, L1 is an optical path length (OPL) of the first reference arm, L2 is an OPL of the second reference arm, Lc1 is a first resonator loop length of the first reference arm, and Lc2 is a second resonator loop length of the second reference arm.

Figure 6:
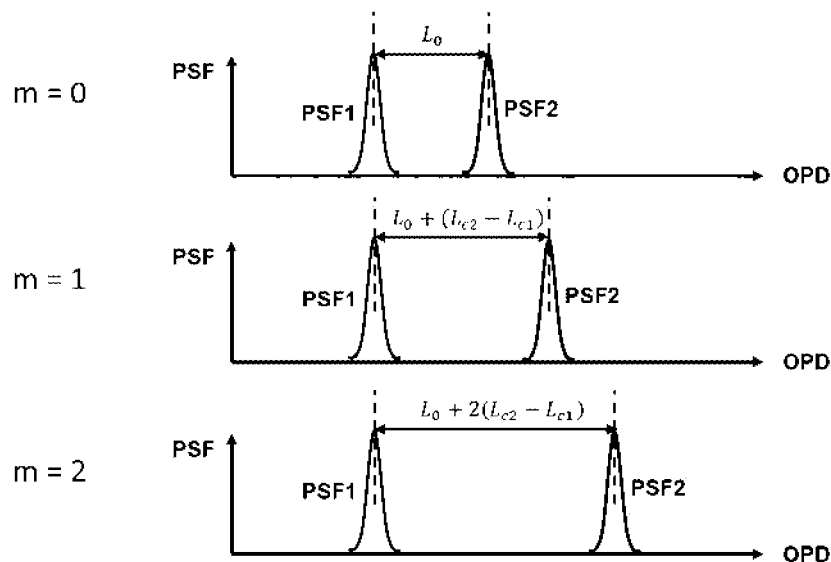
FIG. 6. is a schematic view illustrating separation of point spread functions obtained from the measurement of two interferograms using the two parallelly connected range-extension resonators shown in FIG. 5.

As shown in FIG. 6, two point spread functions (PSFs) obtained from the discrete Fourier transform of the interference waveforms are separated based on the resonator loop length difference as the order increases.

FIG. 7. is a schematic view of the range extension apparatus made with single PM fiber resonator for creating recirculating LO copies and identifying the order of the recirculation.

More specifically, an example of a range extender implemented with polarization maintaining (PM) fiber resonator is illustrated in FIG. 7. The fiber resonator-based range extension with range identification can also be implemented by utilizing two polarization modes in a fiber resonator made with polarization maintaining fiber (PMF). When they are coupled into the cavity, they circulates commonly in the loop and relative delay is made due to the birefringence between the two modes. The delay increases every loop defined by an optical path difference that is defined by OPD=$L_F$−$L_S$=($l_0$+ $ml_c$)$\Delta n$, where m is the order of multiplication (0, 1, 2, 3, . . . ), lo is a fiber length after the splice point for m=0, lc is a fiber length of the cavity.

Typically, a group of interferences is made due to the two overlapped LO from the two PM modes. Two PSFs may be obtained from the interferograms allowing us to determine the OPD difference from the peaks of the PSF. The range order identification is made similarly by measuring the relative OPD difference.

FIG. 8. is a schematic view illustrating a separation of the point spread functions obtained from the measurement of two interferograms using the single PM fiber resonator.

Figure 9A:
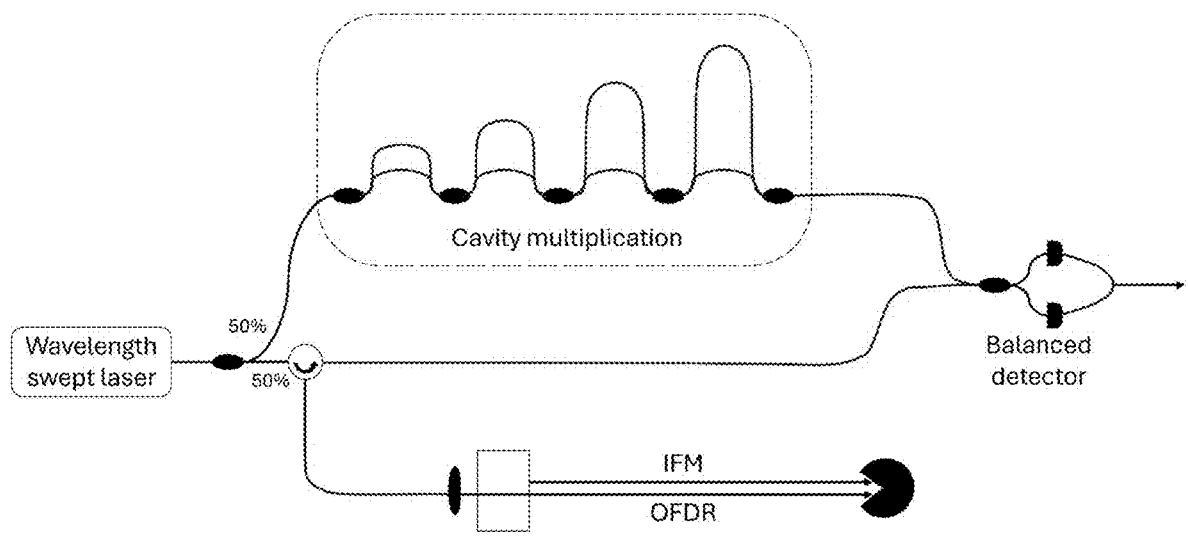
FIG. 9(a) is a schematic view of an optical frequency domain reflectometry (OFDR) with cascaded fiber optic couplers as a range extender and according to the present disclosure.

An example of Optical Frequency Domain Reflectometry with range extension using the cascaded fiber optic couplers are illustrated in FIG. 9(a).

As shown in FIG. 9(a), IFM is a He—Ne laser Michelson interferometer used as an interferometer fringe counting for displacement reference measurement, and a wavelength swept laser is used as a light source in the interferometer. Here, it is important to note that the displacement measurement is not a part of the system claimed in this invention. It is only for helping to understand the principle of operation associated with the range extension. Local oscillation of the laser beam is split in two arms of the first coupler and delayed relatively. There is no restriction of the delay length. As they are subsequently split and delayed, the length increased by the first delay length multiplied by $2^N$, where N is the order of the coupler cascade. The interference is detected after combining the LO and the lights from measurement arm. Depending on the OPD from the measurement arm, an order of the delayed copies interacts coherently at the detector creating periodic interference while the wavelength of the laser is swept in time.

Figure 9B:
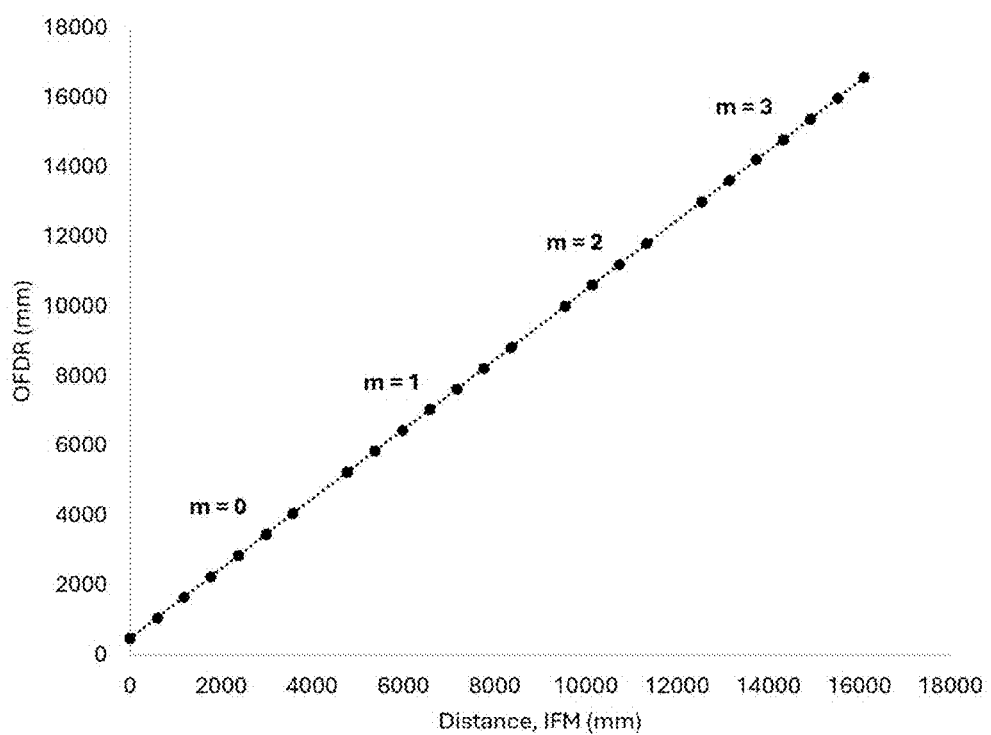
FIG. 9(b) shows an example of displacement measurements using the OFDR with a reference displacement measurement carried out using a He—Ne laser Michelson interferometer for counting an interferometer fringe.

FIG. 9(b) shows an example of displacement measurements using the OFDR system where a reference displacement measurement was made with a He—Ne laser Michelson interferometer used as an interferometer fringe counting. Again, the displacement measurement is only for plotting purpose helping to get relation between physical distance versus signal detection in this OFDR. As an example of the system, a fiber optic wavelength sweep laser may be used. It may have an instantaneous linewidth of 0.02 nm and a sweep bandwidth of 40 nm at 1550 nm sweeping at 1,000 sweeps per second. The coherence length of the laser is determined by the center wavelength and the linewidth. Theoretically, the coherence length is equivalent to 50 mm under this condition. Thus, it can range +/−25 mm in distance in the system shown in FIG. 9(a). If the cascaded delay lines create copies with 50 mm incremental delay as shown in FIG. 9(b), a maximum range can be extended up to $50 \times 2^4 = 800$ mm.

The number of copy identification may be implemented by building the system with a polarization maintaining fiber using the two orthogonal polarization modes. The input lights may be launched to the fiber with balanced power to the two modes. The two modes may propagate through the PM fiber long enough prior to entering to or after passing the cascaded delay as an initial offset so that the net polarization mode delay at the balanced detector is sufficiently made longer than the delay (50 mm) multiplied by the wavelength per the beat length (typically 1.5 micron per mm).

As described above, the present disclosure provides the interferometry and the methods for extending the measurement range of apparatus for OFDR and SDR. The OFDR system in this method replicates local oscillation (LO) with an optical cavity or optical delay lines. It creates a series of temporally delayed copies of the LO for the purpose of extending ranging range beyond the coherence length limited by the wavelength linewidth of the system. It includes several different ways of identifying corresponding delays of the replicated copies associated with the interference. An example of the system consists of light source, measurement interferometer arm, interferometer reference arm with the delayed copies, optional auxiliary interferometer for k-domain linearization (so-called k-clock), and receivers for optical intensity to voltage signal conversion.

The replication can be realized by cascading optical delay lines (for example achieved by multi-port optical switches) or using an optical cavity (for example using optical ring resonators) for repeating optical coherence as time-delayed copies in the reference arm (in other words, along the distance). Since it repeats along the distance, the coherence interaction with the measurement arm (interference) is extended longer than its intrinsic coherence length. Interferences are made with lights reflected from a target as long as the target is within the copied coherence range. The repetition of the coherence length creates the range ambiguity as the intrinsic nature of the Fourier transformation which could result in wrong absolute ranging measurements. In other words, a target located L distance further than the LO length could generate the same beat frequency as another target located L distance closer than the LO length.

An identification of the interfering replication copy is needed for determining proper ranging.

As described above, a system configuration and a method for identifying the delay-line replication copy are disclosed. The method may include multiplication of material and waveguide dispersion, multiplication of differential delays, multiplication of polarization mode delay, etc.

By cascading optical delay lines or using the optical cavity for repeating optical coherence as time-delayed copies in the reference arm and identifying the interfering replication copies in the present disclosure, a significant increase in range is achieved compared to the conventional broadband interferometry.

It will be apparent to those skilled in the art that various modifications and variations can be made in the interferometry and a method for range extension by reference replications and identification of the present disclosure without departing from the spirit or scope of the aspects. Thus, it is intended that the present disclosure covers the modifications and variations of the aspects provided they come within the scope of the appended claims and their equivalents.

What is claimed is:

1. A broadband interferometry device for a measurement range extension beyond a coherence length of a light source, comprising:
    a wavelength tunable laser as the light source outputting a coherent wavelength light;
    an interferometer including a reference arm and a measurement arm and disposed between the wavelength tunable laser and a target to be measured;
    a first beam splitter dividing the coherent wavelength light into a first portion of the reference arm and a second portion of the measurement arm; and
    a signal processing circuit including first and second photodiodes for photocurrent generation, a transimpedance amplifier for voltage conversion and an analog electrical differential amplifier for amplifying a difference between the first and second portions of the coherent wavelength light,
    wherein a local oscillation of the first portion of the coherent wavelength beam is replicated to generate a series of temporally delayed copies of the local oscillation, and quantifiable optical properties are inserted into the temporally delayed copies for incremental quantification as the number of the delayed copies of the local oscillation increase for extension of a measurement range to the target beyond the coherence length of the light source.

2. The broadband interferometry device of claim 1, wherein the first photodiode has an anode connected to a cathode of the second photodiode with a bias voltage for rejecting common-mode signals followed by the transimpedance amplifier that converts coupled current to voltage signals.

3. The broadband interferometry device of claim 1, further comprising a second beam splitter directing the first portion of the coherent wavelength light in the reference arm and the measurement arm to the first photodiode, and the second portion of the coherent wavelength light in the measurement arm and the reference arm to the second photodiode.

4. The broadband interferometry device of claim 3, further comprising an objective lens directing a portion of power of the light source routed by the measurement arm to the target and collecting scattered lights back into a fiber optic circulator to be routed into the second beam splitter.

5. The broadband interferometry device of claim 4, wherein the second beam splitter includes a 2×2 fiber optic coupler.

6. The broadband interferometry device of claim 4, wherein the second beam splitter combines optical waves from the measurement arm and the reference arm and split the combined light into two ways directing to the first and second photodiodes to create a beating in the optical waves as interference.

7. The broadband interferometry device of claim 6, wherein the two ways of the beating have a 180 degree phase shift each other so that beating signals are summed up and common signals are canceled out.

8. The broadband interferometry device of claim 1, wherein the analog electrical differential amplifier has positive and negative inputs to be summed up with interference signal modulations having 180 degree phase shift, and to be canceled out with unshifted non-interference signals.

9. The broadband interferometry device of claim 1, wherein the reference arm provides sufficient delay for at least matching an internal delay length in the measurement arm and the interferometer allows the local oscillation to be repeated with incremental time delays.

10. The broadband interferometry device of claim 1, wherein the replication of the first portion of the coherent wavelength beam is performed through a cavity multiplication or a delay multiplication by using a fiber optic cavity.

11. The broadband interferometry device of claim 10, wherein the fiber optic cavity includes a fiber optic Fabry-Perot cavity or a free space Fabry-Perot cavity where the first portion of the coherent wavelength beam in the fiber optic cavity circulates with a fixed circulation time and a fraction of the first portion of the coherent wavelength beam is coupled out to an output port repeatedly every circulation loop.

12. The broadband interferometry device of claim 11, wherein the fiber optic Fabry-Perot cavity includes two reflectors attached to both ends with a 2×2 fiber optic coupler.

13. The broadband interferometry device of claim 11, wherein the fiber optic cavity includes a dispersion compensation fiber or a chirped fiber Bragging grating.

14. The broadband interferometry device of claim 11, wherein the fiber optic cavity includes a single mode fiber system that comprises a first reference arm and a second reference arm respectively include a first cavity with a first fiber optic ring resonator and a second cavity with a second fiber optic ring resonator.

15. The broadband interferometry device of claim 14, wherein an optical path difference (OPD) between the first reference arm and the second reference arm of the fiber optic cavity is represented by an equation, $OPD = L_2 - L_1 = L_0 + m(L_{c2} - L_{c1})$, where m is an order of multiplication (0, 1, 2, 3, ...), $L_0$ is an OPD for m=0, $L_1$ is an optical path length (OPL) of the first reference arm, $L_2$ is an OPL of the second reference arm, $L_{c1}$ is a first resonator loop length of the first reference arm, and $L_{c2}$ is a second resonator loop length of the second reference arm.

16. The broadband interferometry device of claim 10, wherein the delay multiplication is achieved by cascaded two arm delay lines made with two fiber couplers that generate a finite number of copies of the local oscillation by factor of 2N (N being a cascaded number).

17. The broadband interferometry device of claim 10, wherein the fiber optic cavity includes two polarization modes in a fiber resonator made of a polarization maintaining fiber (PMF).

18. The broadband interferometry device of claim 1, wherein the quantifiable optical properties include a wavelength group delay, a chromatic dispersion, a polarization mode dispersion and a modal dispersion.

19. The broadband interferometry device of claim 1, wherein the quantifiable optical properties are continuously accumulated while the first portion of the coherent wavelength light propagates in the reference arm and ends up with discrete and incremental quantities at a roundtrip loop in the reference arm or the series of temporally delayed copies of the local oscillation.

20. The broadband interferometry device of claim 1, wherein the quantifiable optical properties are used to measure accumulated group delay dispersions realized by the number of circulations in the reference arm.

21. The broadband interferometry device of claim 1, wherein interference waveforms of an output of the differential amplifier or an output of the transimpedance amplifier followed by signal digitization are Fourier transformed to obtain two point spread functions (PSFs) separated in accordance with a difference in first and second resonator loop lengths.

22. A broadband interferometry device for a measurement range extension beyond a coherence length of a light source, comprising:
a wavelength tunable laser as the light source outputting a coherence wavelength beam; and
an interferometer disposed between the wavelength tunable laser and a target to be measured and including a reference arm, a measurement arm and a device combining a reference beam and a measurement beam to produce a combined interference beam,
wherein a local oscillation of the reference beam is replicated by a cavity multiplication or cascading optical delayed lines with a fiber optic cavity, and quantifiable optical properties including at least one of a wavelength group delay, a chromatic dispersion, a polarization mode dispersion and a modal dispersion are inserted into the local oscillation of the reference beam to incrementally quantify the replicated copies of the local oscillation as the number of the delayed copies of the local oscillation increase for extension of a measurement range to the target.

23. A method for extending an interferometric measurement range beyond a coherence length of a light source, comprising:
directing a reference beam from a wavelength tunable laser to a reference interferometer arm and directing a measurement beam to be reflected by an object for measurement;
multiplicating a cavity or optical delay lines of a local oscillation in a reference beam by $M^N$ (M being the number of interferometer arms and N being the number of cascaded couplers in the reference interferometer arm) to generate a series of temporally delayed copies of the local oscillation of the reference beam;
inserting quantifiable optical properties to the local oscillation in the reference beam;
detecting localized interference fringes using a photoreceiver followed by a signal digitizer after combining the local oscillation in the reference beam and the measurement beam; and
analyzing the interference fringes for the measurement range extension.

24. The method of claim 23, wherein the quantifiable optical properties are continuously accumulated while a first portion of the coherent wavelength beam propagates in the reference arm and ends up with discrete and incremental quantities at a roundtrip loop in the reference arm or the series of temporally delayed copies of the local oscillation.

25. The method of claim 23, wherein the quantifiable optical properties are used to measure accumulated group delay dispersions realized by the number of circulations in the reference arm.

26. The method of claim 23, wherein the inserting quantifiable optical properties to the multiplicated cavity or the multiplicated optical delay lines in a cross-chirp interferometer comprises:
preparing a set of numerical complex reference waveforms for convolution in a signal processing stage; and
searching an optimum waveform compression that yields a highest PSF amplitude or a narrowest PSF width by applying the set of complex reference waveforms.

27. The method of claim 23, wherein the inserting quantifiable optical properties to the multiplicated cavity or the multiplicated optical delay lines in an optical frequency domain reflectometer comprises:
preparing a set of numerical complex phases with incremental dispersions in a signal processing stage after the signal digitizer; and
searching an optimum PSF that yields a highest PSF amplitude or a narrowest PSF width by applying a phase term as multiplication prior to a Fourier transformation.

* * * * *